US012614922B2

(12) United States Patent
Ali et al.

(10) Patent No.: US 12,614,922 B2
(45) Date of Patent: Apr. 28, 2026

(54) TESTING OF A DISTRIBUTED ENERGY RESOURCE (DER) MANAGEMENT SYSTEM (DERMS)

(71) Applicant: Quanta Technology, LLC, Raleigh, NC (US)

(72) Inventors: Syed Qaseem Ali, Bowmanville (CA); Bora Togay, Toronto (CA); Johannes Kruger, Toronto (CA); Farid Katiraei, Markham (CA); Shadi Chuangpishit, Richmond Hill (CA)

(73) Assignee: Quanta Technology, LLC, Raleigh, NC (US)

( * ) Notice: Subject to any disclaimer, the term of this patent is extended or adjusted under 35 U.S.C. 154(b) by 359 days.

(21) Appl. No.: 18/337,776

(22) Filed: Jun. 20, 2023

(65) Prior Publication Data
US 2024/0429740 A1 Dec. 26, 2024

(51) Int. Cl.
| | |
|---|---|
| *H02J 13/00* | (2026.01) |
| *G05B 19/042* | (2006.01) |
| *H02J 3/38* | (2006.01) |

(52) U.S. Cl.
CPC ...... *H02J 13/00002* (2020.01); *G05B 19/042* (2013.01); *H02J 3/381* (2013.01);
(Continued)

(58) Field of Classification Search
CPC .......... H02J 13/00002; H02J 13/00006; H02J 3/381; H02J 2203/20; G05B 19/042; G05B 2219/2639
See application file for complete search history.

(56) References Cited

U.S. PATENT DOCUMENTS

| | | | | |
|---|---|---|---|---|
| 10,686,314 B2* | 6/2020 | Matan | ................... | G06G 7/635 |
| 11,159,020 B2* | 10/2021 | Li | .................... | H02J 13/00004 |

(Continued)

OTHER PUBLICATIONS

"DERMS Communication Test System—an architectural overview", Quality Logic, White paper, accessed 2022, 1-9.
(Continued)

*Primary Examiner* — Nicholas Augustine
(74) *Attorney, Agent, or Firm* — Murphy, Bilak & Homiller, PLLC

(57) ABSTRACT

A cloud computing system is provided for testing a Distributed Energy Resource (DER) Management System (DERMS) that manages operation of DERs connected to a power system. The cloud system implements a DERMS testing platform on virtualized cloud computing resources of the system. The platform tests the DERMS and is modularized. In some embodiments, the DERMS is modularized into at least a simulation module and a communication module, where the simulation module is configured to simulate DER(s) of power system and the communication module communicatively interfaces DERMS with DER(s) via communication network(s). The simulation module also simulates the power system under test conditions as the DERMS manages operation of DER(s) via the communication module. The cloud computing system exposes the platform as a service for testing the DERMS under test conditions. The cloud system scales the resources allocated to the platform with the number of DER(s) simulated under different test conditions.

26 Claims, 5 Drawing Sheets

(52) U.S. Cl.
CPC *H02J 13/00006* (2020.01); *G05B 2219/2639* (2013.01); *H02J 2203/20* (2020.01)

(56) References Cited

U.S. PATENT DOCUMENTS

| | | | |
|---|---|---|---|
| 2012/0029897 A1* | 2/2012 | Cherian | H02J 13/00028 703/18 |
| 2013/0166085 A1* | 6/2013 | Cherian | G05F 1/66 700/291 |
| 2014/0049109 A1* | 2/2014 | Kearns | H02J 13/00002 307/52 |
| 2016/0211664 A1* | 7/2016 | Subbotin | H02J 3/003 |
| 2016/0329710 A1* | 11/2016 | Clifton | H02J 13/00034 |
| 2017/0250539 A1* | 8/2017 | Feng | H02J 13/00026 |
| 2018/0219381 A1* | 8/2018 | Laval | H02J 13/00017 |
| 2019/0140756 A1* | 5/2019 | Cruickshank, III | H04H 60/96 |
| 2019/0148941 A1* | 5/2019 | Wang | H02J 3/38 700/287 |
| 2019/0199098 A1* | 6/2019 | Shah | H02J 3/38 |
| 2020/0036188 A1* | 1/2020 | Ren | H02J 3/12 |
| 2020/0153274 A1* | 5/2020 | Münz | H02J 13/00007 |
| 2022/0042708 A1* | 2/2022 | Benefield | H02J 7/0048 |
| 2022/0109303 A1* | 4/2022 | Srinivasan | H02J 3/381 |
| 2022/0318451 A1* | 10/2022 | Meton | G06F 30/20 |
| 2023/0198262 A1* | 6/2023 | Vergara | H02J 3/381 700/291 |

OTHER PUBLICATIONS

Ren, W., et al., "Simulation Platform for Integration of DER (SPIDER): Testbed Software Manual", EPRI, Software Manual, Feb. 2022, 1-114.
Simmins, J., "Distributed Energy Resource Management System (DERMS) Master Station User Manual", 3002011482, Software Manual, Electric Power Research Institute, Palo Alto, California, Aug. 2017, 1-70.
Anandan, J., "EPRI's Distributed Energy Resources Integration Testbed and Toolkit: An Overview of EPRI Test Tools for DER Integration", 3002016138, Technical Update, Electric Power Research Institute, Palo Alto, California, Dec. 2019, 1-38.
Nowak, S., et al., "Cloud-based DERMS Test Platform Using Real-time Power System Simulation", 2018 IEEE Power & Energy Society General Meeting (PESGM), Portland, OR, doi: 10.1109/PESGM.2018.8585806, Aug. 2018, 1-5.
Poudel, Shiva, et al., "Modeling Environment for Testing a Distributed Energy Resource Management System (DERMS) Using GridAPPS-D Platform", Digital Object Identifier vol. 10, 10.1109/ACCESS.2022.3192845, Jul. 22, 2022, 1-13.

* cited by examiner

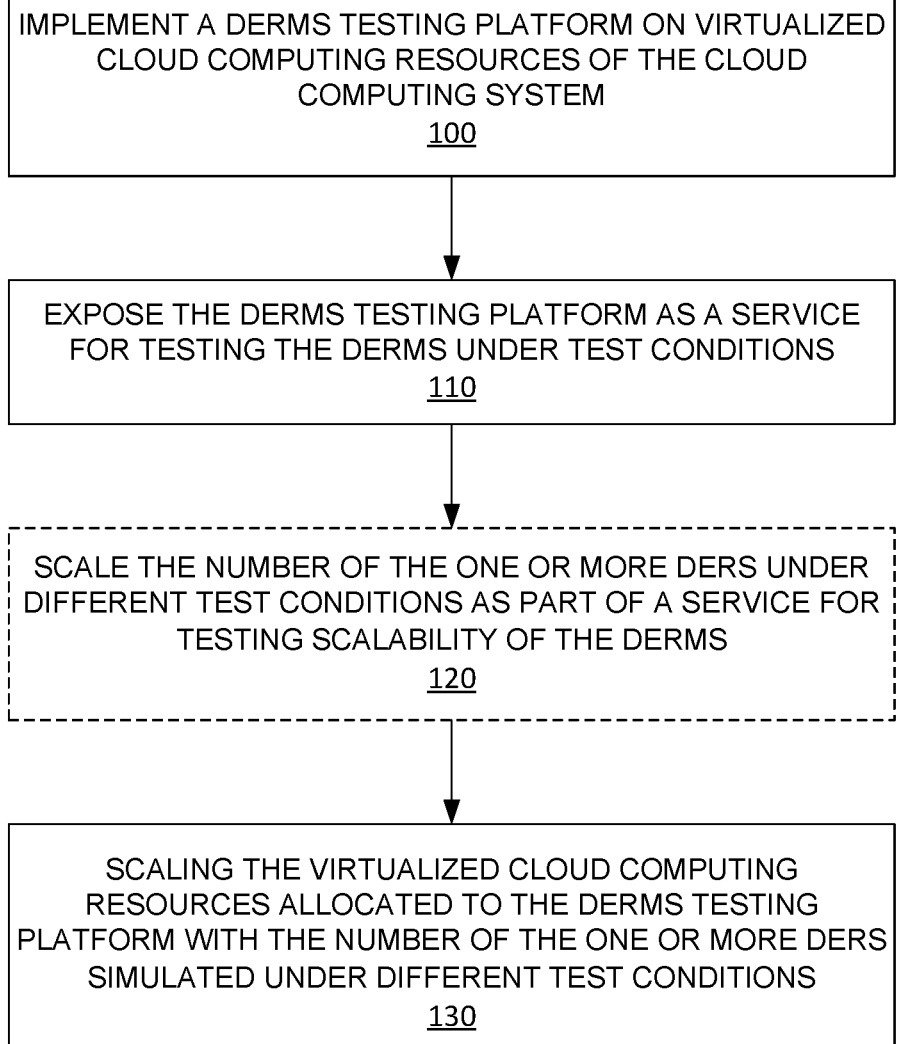

IMPLEMENT A DERMS TESTING PLATFORM ON VIRTUALIZED
CLOUD COMPUTING RESOURCES OF THE CLOUD
COMPUTING SYSTEM
100

EXPOSE THE DERMS TESTING PLATFORM AS A SERVICE
FOR TESTING THE DERMS UNDER TEST CONDITIONS
110

SCALE THE NUMBER OF THE ONE OR MORE DERS UNDER
DIFFERENT TEST CONDITIONS AS PART OF A SERVICE FOR
TESTING SCALABILITY OF THE DERMS
120

SCALING THE VIRTUALIZED CLOUD COMPUTING
RESOURCES ALLOCATED TO THE DERMS TESTING
PLATFORM WITH THE NUMBER OF THE ONE OR MORE DERS
SIMULATED UNDER DIFFERENT TEST CONDITIONS
130

*FIGURE 4*

TESTING OF A DISTRIBUTED ENERGY RESOURCE (DER) MANAGEMENT SYSTEM (DERMS)

TECHNICAL FIELD

The present application relates generally to distributed energy resource (DER) management systems (DERMSs) and more particularly relates to testing of DERMSs.

BACKGROUND

A traditional power system centralizes power generation at the utility level and distributes bulk power to communities via a power grid. There is however a growing popularity of consumer solar power, commercial wind farms, electric vehicles, and other privately-owned resources that are distributed closer to the point of energy consumption, e.g., behind the meter, for providing generation, load, or storage. These distributed residential-scale resources are generally referred to as distributed energy resources (DERs) and span renewable generation, energy storage, and demand response resources. As examples, DERs broadly include appliances such as water heaters and heating, ventilation, and air conditioning (HVAC) systems, generators such as photovoltaic panels, and energy storage systems such as Battery Energy Storage Systems (BESS) and plug-in electric vehicles (PEVs). DERs also encompass monitoring-only type devices, such as an Intelligent Electronic Device (IED), a remote terminal unit (RTU), or the like, e.g., for use cases targeted at situational awareness.

DERs help meet the day-to-day energy demand, but present economic and operational challenges. For example, DERs that are weather dependent can produce rapid changes in power output, resulting in ramping events that introduce scheduling challenges for utilities operating within short-term electricity trading markets. DERs can also cause frequency instability, transmission congestion, voltage variations, overloads, phase load imbalances, and other variations from operating standards.

A Distributed Energy Resource Management System (DERMS) is a platform used to monitor, control, and otherwise manage the DERs connected to a power system, as part of addressing some of the challenges that DERs introduce. A DERMS in this regard provides coordinated scheduling and optimization of DER operations, for resiliency, reliability, and/or economic objectives. In some cases, a DERMS may aggregate many individual DERs into a virtual DER, also referred to as a virtual power plant, e.g., so that the virtual DER can act as a single entity. Alternatively or additionally, though, a third-party aggregator may provide this aggregation as a service, so as to operate as an intermediary between the power system operator and the consumers that provide the DERs.

Testing a DERMS proves challenging, though. The testing complexity and the availability of real-world test equipment create practical barriers to DERMS testing, especially as the number of aggregators and/or DERs being aggregated scales upward. Indeed, as the number of DERs increases with electrification and decarbonization targets, the number of aggregators interfacing the DERMS will increase. In fact, it is expected that effective DERMS testing will require simulating 100s or 1000s of DERs and their communication interfaces. Known approaches to DERMS testing lack the resources necessary for this, as their scalability is limited either by the number of communication interfaces they can support or by the number of DERs they can simulate.

SUMMARY

Some embodiments herein implement a Distributed Energy Resource (DER) Management System (DERMS) testing platform on virtualized cloud computing resources. The DERMS testing platform simulates agents (e.g., DER(s) and/or DER aggregator(s)) in order to test how a DERMS manages operation of the agents under test conditions. Exploiting the cloud computing implementation, some embodiments advantageously scale the DERMS testing platform with the number of agents simulated. In fact, in some embodiments, the DERMS testing platform is modularized in a way that facilitates flexible scaling, so that resources can be respectively allocated to different modules on a module by module basis. Some embodiments thereby advantageously accommodate testing how a DERMS scales with the number of aggregators and/or DERs being aggregated.

More particularly, embodiments herein include a method performed by a cloud computing system for testing a Distributed Energy Resource (DER) Management System (DERMS) configured to manage operation of DERs connected to a power system. The method comprises implementing a DERMS testing platform on virtualized cloud computing resources of the cloud computing system. In some embodiments, the DERMS testing platform is a platform for testing the DERMS and is modularized into at least a simulation module configured to simulate one or more DERs of the power system. In some embodiments, the DERMS testing platform is a platform for testing the DERMS and is modularized into at least a communication module that communicatively interfaces the DERMS with the one or more DERs via one or more communication networks. In some embodiments, the simulation module is further configured to simulate the power system under test conditions as the DERMS manages operation of the one or more DERs via the communication module. The method also comprises exposing the DERMS testing platform as a service for testing the DERMS under test conditions. The method also comprises scaling the virtualized cloud computing resources allocated to the DERMS testing platform with the number of the one or more DERs simulated under different test conditions.

In some embodiments, the simulation module is further modularized into a DER simulation module configured to simulate the one or more DERs and a power system simulation module configured to simulate the power system. In some embodiments, the DER simulation module is configured to model physics and functionality of each of the one or more DERs, and the power system simulation module is configured to simulate physics and topological relationships between the one or more DERs under the different test conditions.

In some embodiments, the simulation module is configured to simulate the power system under a test condition by dividing the power system into multiple subsystems, simulating different subsystems under the test condition in parallel using different sets of virtualized cloud computing resources, and stitching simulation results for the subsystems together to derive a simulation result for the power system as a whole under the test condition.

In some embodiments, scaling the virtualized cloud computing resources allocated to the DERMS testing platform comprises scaling the virtualized cloud computing resources respectively allocated to different modules of the DERMS testing platform on a module by module basis.

In some embodiments, the method further comprises scaling the number of the one or more DERs under different test conditions as part of a service for testing scalability of the DERMS. In some embodiments, scaling the virtualized cloud computing resources comprises, based on the scaling of the number of the one or more DERs, scaling virtualized compute and/or memory resources allocated to the one or more DERs and/or the simulation module. In some embodiments, scaling the virtualized cloud computing resources comprises, based on the scaling of the number of the one or more DERs, scaling virtualized communication resources allocated to the communication module.

In some embodiments, scaling the virtualized cloud computing resources comprises separately scaling different types of virtualized cloud computing resources with the number of the one or more DERs simulated under different test conditions. In some embodiments, the different types of virtualized cloud computing resources include at least compute resources, memory resources, and communication resources.

In some embodiments, the DERMS testing platform is further modularized into a memory module comprising virtualized memory shared amongst at least some modules of the DERMS testing platform that are configured to communicate with one another via the shared virtualized memory. In some embodiments, scaling the virtualized cloud computing resources allocated to the DERMS testing platform comprises scaling the virtualized memory allocated to the memory module with the number of the one or more DERs simulated under different test conditions.

In some embodiments, the DERMS testing platform is further modularized into a test manager module configured to define, execute, and/or manage testing of the DERMS under different test conditions as part of the service.

In some embodiments, the DERMS testing platform is further modularized into at least an analytics module configured to generate analytics representing results of testing the DERMS under different test conditions. In other embodiments, the DERMS testing platform is further modularized alternatively or additionally into at least a visualization module configured to generate visualizations of the analytics generated by the analytics module. In yet other embodiments, the DERMS testing platform is further modularized alternatively or additionally into at least a user interface module configured to provide an interface to a user of the DERMS testing platform to configure and/or control one or more other modules of the DERMS testing platform. In still yet other embodiments, the DERMS testing platform is further modularized alternatively or additionally into at least one or more data source modules configured to source one or more respective types of data based on which different test conditions are defined. In some embodiments, the one or more respective types of data include weather data and/or energy market data.

In some embodiments, the one or more DERs include one or more virtual DERs, with each virtual DER aggregated from multiple physical DERs of the power system.

Other embodiments herein include a cloud computing system for testing a Distributed Energy Resource (DER) Management System (DERMS) configured to manage operation of DERs connected to a power system, the cloud computing system comprising cloud computing infrastructure. The computing infrastructure is configured to host virtualized cloud computing resources. The computing infrastructure is also configured to implement a DERMS testing platform on the virtualized cloud computing resources. In some embodiments, the DERMS testing platform is a platform for testing the DERMS and is modularized into at least a simulation module configured to simulate one or more DERs of the power system. In some embodiments, the DERMS testing platform is a platform for testing the DERMS and is modularized into at least a communication module that communicatively interfaces the DERMS with the one or more DERs via one or more communication networks. In some embodiments, the simulation module is further configured to simulate the power system under test conditions as the DERMS manages operation of the one or more DERs via the communication module. The computing infrastructure is also configured to expose the DERMS testing platform as a service for testing the DERMS under test conditions. The computing infrastructure is also configured to scale the virtualized cloud computing resources allocated to the DERMS testing platform with the number of the one or more DERs simulated under different test conditions.

In some embodiments, the simulation module is further modularized into a DER simulation module configured to simulate the one or more DERs and a power system simulation module configured to simulate the power system. In some embodiments, the DER simulation module is configured to model physics and functionality of each of the one or more DERs, and the power system simulation module is configured to simulate physics and topological relationships between the one or more DERs under the different test conditions.

In some embodiments, the simulation module is configured to simulate the power system under a test condition by dividing the power system into multiple subsystems, simulating different subsystems under the test condition in parallel using different sets of virtualized cloud computing resources, and stitching simulation results for the subsystems together to derive a simulation result for the power system as a whole under the test condition.

In some embodiments, the cloud computing infrastructure is configured to scale the virtualized cloud computing resources allocated to the DERMS testing platform by scaling the virtualized cloud computing resources respectively allocated to different modules of the DERMS testing platform on a module by module basis.

In some embodiments, the cloud computing infrastructure is further configured to scale the number of the one or more DERs under different test conditions as part of a service for testing scalability of the DERMS. In some embodiments, the cloud computing infrastructure is configured to scale the virtualized cloud computing resources by, based on the scaling of the number of the one or more DERs, scaling virtualized compute and/or memory resources allocated to the one or more DERs and/or the simulation module. In some embodiments, the cloud computing infrastructure is configured to scale the virtualized cloud computing resources by, based on the scaling of the number of the one or more DERs, scaling virtualized communication resources allocated to the communication module.

In some embodiments, the cloud computing infrastructure is configured to scale the virtualized cloud computing resources by separately scaling different types of virtualized cloud computing resources with the number of the one or more DERs simulated under different test conditions. In some embodiments, the different types of virtualized cloud computing resources include at least compute resources, memory resources, and communication resources.

In some embodiments, the DERMS testing platform is further modularized into a memory module comprising virtualized memory shared amongst at least some modules of the DERMS testing platform that are configured to communicate with one another via the shared virtualized memory. In some embodiments, the cloud computing infrastructure is configured to scale the virtualized cloud computing resources allocated to the DERMS testing platform by scaling the virtualized memory allocated to the memory module with the number of the one or more DERs simulated under different test conditions.

In some embodiments, the DERMS testing platform is further modularized into a test manager module configured to define, execute, and/or manage testing of the DERMS under different test conditions as part of the service.

In some embodiments, the DERMS testing platform is further modularized into at least an analytics module configured to generate analytics representing results of testing the DERMS under different test conditions. In other embodiments, the DERMS testing platform is further modularized alternatively or additionally into at least a visualization module configured to generate visualizations of the analytics generated by the analytics module. In yet other embodiments, the DERMS testing platform is further modularized alternatively or additionally into at least a user interface module configured to provide an interface to a user of the DERMS testing platform to configure and/or control one or more other modules of the DERMS testing platform. In still yet other embodiments, the DERMS testing platform is further modularized alternatively or additionally into at least one or more data source modules configured to source one or more respective types of data based on which different test conditions are defined. In some embodiments, the one or more respective types of data include weather data and/or energy market data.

In some embodiments, the one or more DERs include one or more virtual DERs, with each virtual DER aggregated from multiple physical DERs of the power system.

Other embodiments herein include a non-transitory computer-readable storage medium on which is stored instructions which, when executed by one or more processors of a cloud computing system, causes the cloud computing system to host virtualized cloud computing resources. The non-transitory computer-readable storage medium on which is stored instructions which, when executed by one or more processors of a cloud computing system, also causes the cloud computing system to implement a Distributed Energy Resource (DER) Management System (DERMS) testing platform on the virtualized cloud computing resources. In some embodiments, the DERMS testing platform is a platform for testing the DERMS and is modularized into at least a simulation module configured to simulate one or more DERs of a power system. In some embodiments, the DERMS testing platform is a platform for testing the DERMS and is modularized into at least a communication module that communicatively interfaces the DERMS with the one or more DERs via one or more communication networks. In some embodiments, the simulation module is further configured to simulate the power system under test conditions as the DERMS manages operation of the one or more DERs via the communication module. The non-transitory computer-readable storage medium on which is stored instructions which, when executed by one or more processors of a cloud computing system, also causes the cloud computing system to expose the DERMS testing platform as a service for testing the DERMS under test conditions. The non-transitory computer-readable storage medium on which is stored instructions which, when executed by one or more processors of a cloud computing system, also causes the cloud computing system to scale the virtualized cloud computing resources allocated to the DERMS testing platform with the number of the one or more DERs simulated under different test conditions.

BRIEF DESCRIPTION OF THE DRAWINGS

FIG. 4 is a logic flow diagram of a method performed by a cloud computing system according to some embodiments.

DETAILED DESCRIPTION

Figure 1:
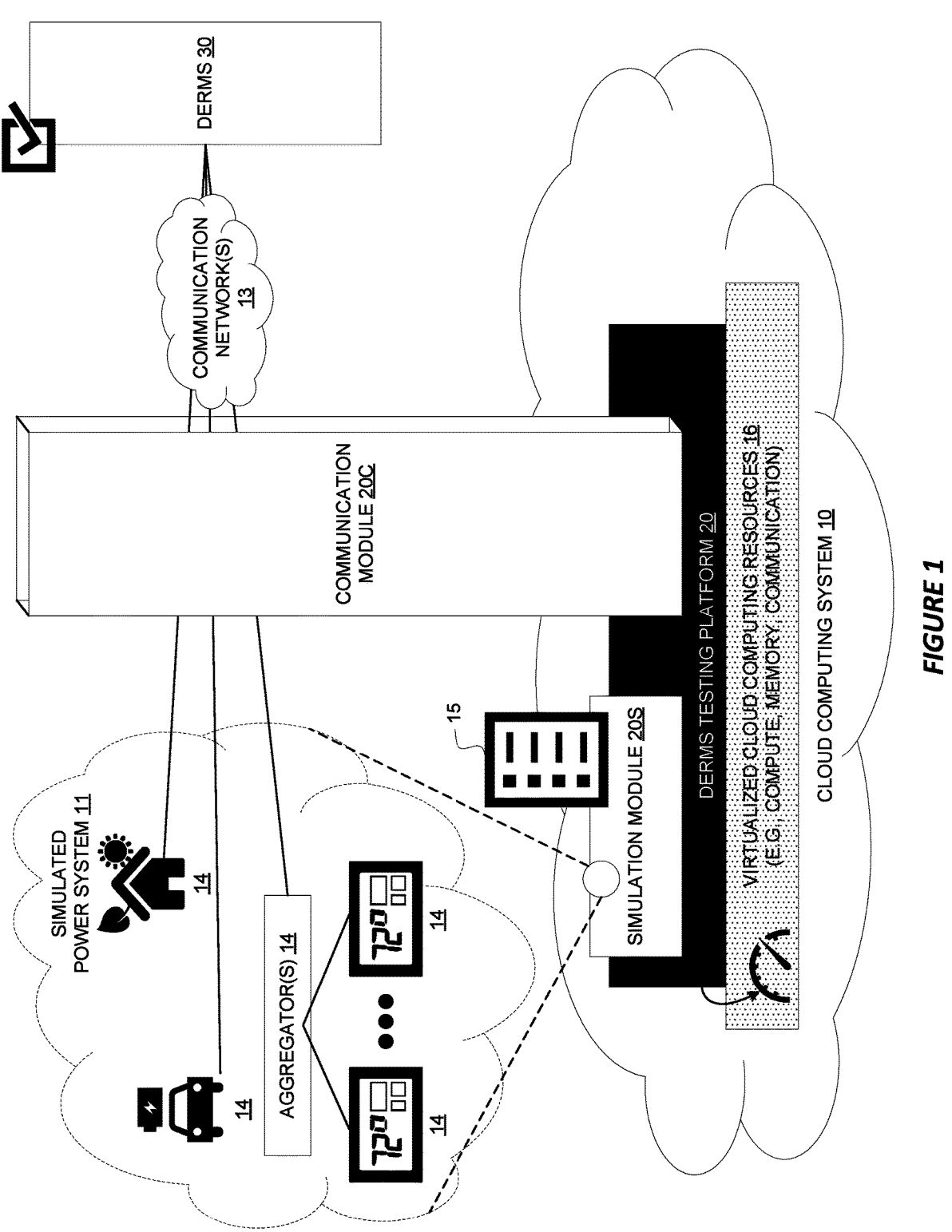
FIG. 1 is a block diagram of a cloud computing system according to some embodiments.

FIG. 1 shows a cloud computing system 10 according to some embodiments. The cloud computing system 10 forms a distributed computing environment that provides on-demand access to a shared pool of virtualized cloud computing resources 12. The virtualized cloud computing resources 12 may include resources of different types, such as virtualized compute resources, memory resources, and/or communication resources. These virtualized cloud computing resources 12 represent portions of the capacity of underlying physical resources (not shown). The virtualized cloud computing resources 12 behave like physical resources, but are provisioned on demand rather than in advance of demand.

Embodiments herein use this cloud computing system 10 for implementing a Distributed Energy Resource (DER) Management System (DERMS) testing platform 20 (also referred to as a DERMS testbed). The cloud computing system 10 implements the DERMS testing platform 20 on its virtualized cloud computing resources 12. The DERMS testing platform 20 is a platform for testing a DERMS 30, also referred to as a DERMS-under-test (DUT). The DERMS testing platform 20 in particular tests how a DERMS 30 manages operation of DERs connected to a power system, e.g., how the DERMS 30 provides coordinated scheduling and optimization of DER operations, for resiliency, reliability, and/or economic objectives.

To do so, the DERMS testing platform 20 simulates a power system 11 as well as one or more DERs 14 in the simulated power system 11. The simulated DER(s) 14 may generally be referred to as 'agents' and may include physical DER(s) and/or virtual DER(s), where a virtual DER is an aggregation of multiple other DERs and may also be referred to as an aggregator. The DERMS testing platform 20 in particular simulates the power system 11 and the DER(s) 14 as the DERMS 30 manages operation of the DER(s) 14. The DERMS testing platform 20 may for example communicate a simulated state of the simulated power system 11 to the DERMS 30 under test, receive control signaling from the DERMS 30 for managing operation of the DER(s) 14, simulate the DER(s) 14 as managed according to the control signaling, and simulate the power system 11 as impacted by the managed DER(s) 14. In some embodiments, the DERMS testing platform 20 actively varies or otherwise controls the conditions under which the DERMS 30 is tested. In this case, the DERMS testing platform 20 simulates the power system 11 and the DER(s)

14 under different test conditions 15, e.g., different weather conditions, energy market conditions, and/or other conditions that impact the DER(s) 14.

Regardless, with the DERMS testing platform 20 implemented on the virtualized cloud computing resources 12, some embodiments herein expose the DERMS testing platform 20 as a service. For example, in some embodiments, the cloud computing system 10 publishes or otherwise makes the DERMS testing platform 20 remotely accessible to a customer, e.g., a utility operator, so that the customer can use the DERMS testing platform 20 to test a DERMS 30 owned or operated by the customer. In these and other embodiments, the cloud computing system 10 provisions virtualized cloud computing resources 12 to the DERMS testing platform 20 once ordered as a service, and thereafter dynamically adjusts allocation of the virtualized cloud computing resources 12 on an ongoing and as-needed basis. That is, the cloud computing system 10 effectively scales the virtualized cloud computing resources 12 that are allocated to the DERMS testing platform 20, e.g., as needed to meet resource demand that may vary per customer and/or over the course of DERMS testing.

Some embodiments herein exploit the scalability of virtualized cloud computing resources 12 to test how a DERMS 30 manages operation of DERs 14 as the number of DERs 14 scales, e.g., scales up to 100s or 1000s of DERs 14. Such testing is referred to as DERMS scalability testing and may be offered as, or as part of, a service for testing scalability of the DERMS 30. The cloud computing system 10 in some embodiments in this regard scales the virtualized cloud computing resources 12 allocated to the DERMS testing platform 20 with the number of DERs 14, e.g., by dynamically increasing or decreasing the number of virtualized cloud computing resources 12 allocated to the DERMS testing platform 20 as the number of DERs 14 managed under test increases or decreases, respectively. DERMS scalability testing in these and other embodiments may advantageously help de-risk the DERMS procurement process and DERMS implementation.

In fact, some embodiments herein modularize the DERMS testing platform 20 in a way that allows resource scaling on a module by module basis, e.g., for realizing module-specific resource scaling. The cloud computing system 10 in this case scales the virtualized cloud computing resources 12 respectively allocated to different modules of the DERMS testing platform 20 on a module by module basis. Modularization of the DERMS testing platform 20 may thereby optimize dynamic resource allocation with finer granularity than if resource scaling were performed for the DERMS testing platform 20 as a whole.

More particularly in this regard, FIG. 1 shows some embodiments where the DERMS testing platform 20 is modularized into a simulation module 20S and a communication module 20C. The communication module 20C communicatively interfaces the DERMS 30 under test with the simulated DER(s) 14, e.g., via one or more communication networks 13. The communication module 20C may thereby provide communication interface(s) supported by the DERMS 30 under test, e.g., enabling the DERMS 30 to execute on a server and/or the cloud. The DERMS 30 thereby manages operation of the DER(s) 14 via this communication module 20C.

The simulation module 20S simulates the power system 11 and the DER(s) 14 under the test conditions 15, as the DERMS 30 manages operation of the DER(s) 14 via the communication module 20C. In some embodiments, the simulation module 20S simulates the power system 11 under a test condition 15 by identifying favorable decoupling points of the power system 11 (such as long lines, transformers, etc.) and dividing it 11 into multiple subsystems, simulating different subsystems under the test condition 15 in parallel using different sets of virtualized cloud computing resources 12, and stitching simulation results for the subsystems together to derive a simulation result for the power system 11 as a whole under the test condition 15. In this case, the simulation module 20S effectively decouples the power system 11 into smaller sizes, to optimize the speed of simulation and the resources required for that simulation.

Modularized in this way, the cloud computing system 10 in some embodiments scales virtualized compute and/or memory resources allocated to the DER(s) 14 and/or the simulation module 20S, based on scaling of the number of DER(s) 14. For example, the larger the number of DER(s) 14, the more virtualized compute and/or memory resources allocated to the simulation module 20S for simulating those DER(s) 14. Alternatively or additionally, the cloud computing system 10 scales virtualized communication resources (e.g., communication interfaces) allocated to the communication module 20C. Similarly, the larger the number of DER(s) 14, the more virtualized communication resources allocated to the communication module 20C. In these and other embodiments, the cloud computing system 10 may separately scale different types of virtualized cloud computing resources 12 with the number of the DER(s) 14 simulated under different test conditions 15, e.g., scale compute resources separately from scaling communication resources.

Figure 2:
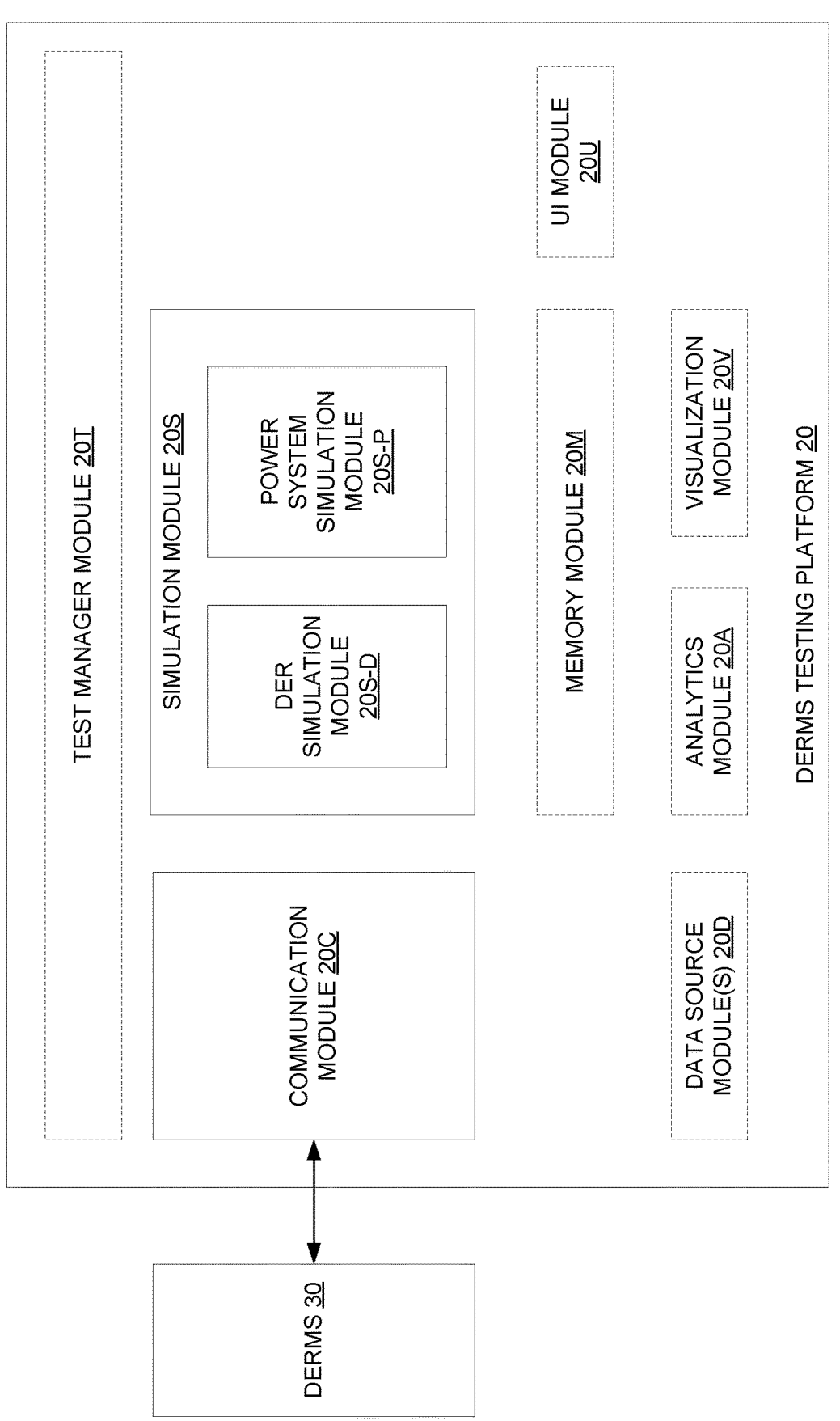
FIG. 2 is a block diagram of a DERMS testing platform that is modularized according to some embodiments.

Some embodiments enable even finer-grained scalability by modularizing the DERMS testing platform 20 even further. For example, in some embodiments shown in FIG. 2, the simulation module 20S is further modularized into a DER simulation module 20S-D and a power system simulation module 20S-P. In this case, the power system simulation module 20S-P simulates the power system 11, whereas the DER simulation module 20S-D simulates the DER(s) 14. In one embodiment, for example, the DER simulation module 20S-D models physics and functionality of each of DER(s) 14, e.g., where different types of DER(s) 14 may have different levels of detail in the model. The power system simulation module 20S-P simulates physics and topological relationships between the DER(s) 14 under the different test conditions 15. The power system simulation module 20S-P may for example host state estimation software for a power system being simulated, e.g., to simulate the physics and topological relationships between the DER(s) 14 and simulated loads. In some embodiments, the power system simulation module 20S-P synchronizes and coordinates simulation engines if co-simulations are required.

Alternatively or additionally, the DERMS testing platform 20 is further modularized into a memory module 20M. The memory module 20M comprises virtualized memory shared amongst at least some modules of the DERMS testing platform 20. These other modules may exploit the memory module 20M for communicating with one another, e.g., by writing to and/or reading from shared memory. In these and other embodiments, the virtualized memory may operate as a sort of record or database of the running state of values for each module, to be accessed by any other module for processing. The memory module 20M may thereby advantageously supplant the need for direct interfaces between the modules of the DERMS testing platform 20, e.g., which may help initialize the tester with prestored conditions to test the DERMS platform. In any event, the cloud computing system 10 may scale the virtualized memory allocated to the memory module 20M with the number of the DER(s) 14 simulated under different test conditions 15. The scaling may for instance reflect the need for more memory as demanded for storing and/or communicating additional DER state as the number of DER(s) 14 increases.

In other embodiments, the DERMS testing platform 20 alternatively or additionally is further modularized into a test manager module 20T. The test manager module 20T is configured to define, execute, and/or manage testing of the DERMS 30 under different test conditions 14 as part of the service. The test manager module 20T may for example be responsible for the definition and orchestration of the testing process. This may involve initialization of the DER(s) 14, the test conditions 15, and/or one or more other modules, as well as controlling execution of the test. The test manager module 20T in some embodiments may also be used for test automation, to predefine and perform use-case specific test routines. For example, the test manager module 20T may be used to define use-case based pre-defined test routines and allow scheduling of test campaigns as a collection of sequential test routines. In still other embodiments, the DERMS testing platform 20 is further modularized into an analytics module 20A. The analytics module 20A is configured to generate analytics representing results of testing the DERMS 30 under the different test conditions 15. The analytics module 20A thereby provides analytics functionality and processing. The data to be analyzed may be obtained from the memory module 20M, e.g., where that data may be real-time data sourced from one or more other modules.

The DERMS testing platform 20 in this regard may also be modularized into one or more data source modules 20D. The data source module(s) 20D may be configured to source one or more respective types of data, e.g., based on which different test conditions 15 are defined. For example, the one or more respective types of data may include weather data and/or energy market data. In this case, the data source module(s) 20D may include a weather data source module and/or an energy market data source module.

In some embodiments, the DERMS testing platform 20 is also modularized into a visualization module 20V. The visualization module 20V is configured to generate visualizations of the analytics generated by the analytics module 20A. The visualizations may for example include graphs, charts, trends, dashboards, and/or any other depictions of data in readable form.

The DERMS testing platform 20 may also include a user interface module 20U. The user interface module 20U is configured to provide an interface to a user of the DERMS testing platform 20 to configure and/or control one or more other modules of the DERMS testing platform 20. The interface may be textual and/or graphical, e.g., so as to take the form of a graphical user interface (GUI). Regardless, the user interface module 20U may allow the user to define and configure DER(s) 14, select and configure the power system simulation module 20P, set up communication interfaces with the DERMS 30, include displays and interfaces for the test manager to define, and/or configure and execute test cases. The user interface module 20U may alternatively or additionally be usable to load previously saved states, allowing the user to start tests with the DER(s) 14 and/or power system 11 initialized from a steady state. The user interface module 20U may also provide an interface to upload model files for the power system simulation module 20P, configuration files for configuring communication interfaces to the DER(s) 14, and any other file that may be used by other modules. In these and other embodiments, the user interface module 20U may include protocols optimized for file transfer, in addition to event-based protocols, e.g., such as a Representation State Transfer (REST) interface.

Figure 3:
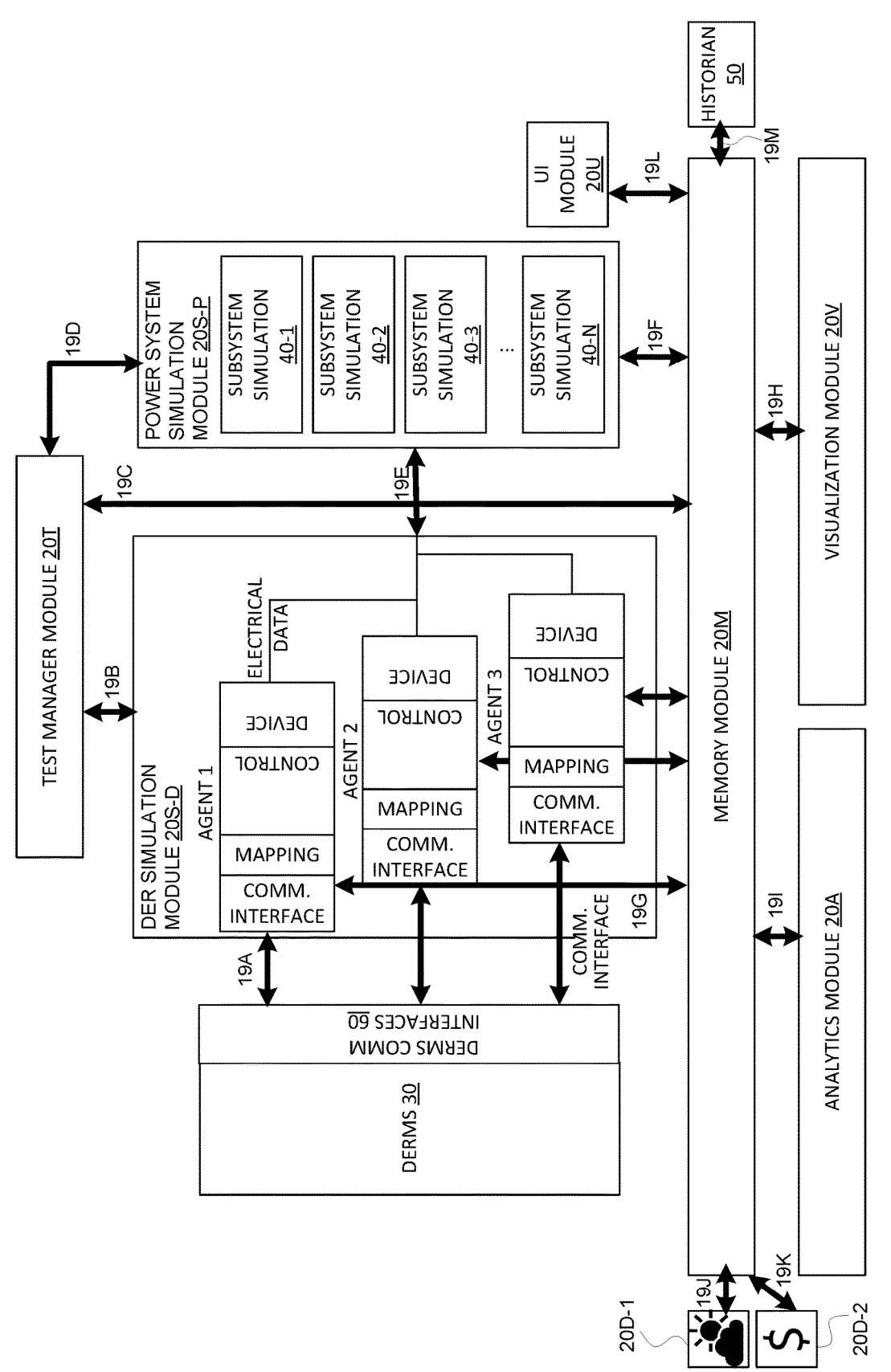
FIG. 3 is a block diagram of a DERMS testing platform that is modularized according to other embodiments.

FIG. 3 shows additional details of the DERMS testing platform 20 according to some embodiments, along with details of communication interfaces between modules. As shown in these embodiments, the DER simulation module 20S-D simulates 3 agents, where each agent may be a physical or virtual DER.

For each agent, the DER simulation module 20S-D provides a communication interface 19A that interface that agent to the DERMS 30 under test. The DER simulation module 20S-D may for example establish the communication interface 19A using virtualized communication resources of the cloud computing system 10, and allocate the communication interface 19A to the respective agent. The type of the communication interface may depend on a type of the agent and/or may otherwise support communication with a corresponding communication interface 60 of the DERMS 30 under test.

For example, communication between the agents and the DERMS 30 in some embodiments is handled using a communication protocol, e.g., Modbus or REST, which can carry large amounts of data with little overhead. Such communication may be carried over either a virtual private network (VPN) or the Internet with the use of public Internet Protocol (IP) address. This advantageously allows the tester to connect to a DERMS service running on a dedicated server, cloud, or a combination of the two, as long as the communication interface(s) are available. Note that, in some embodiments, the DERMS 30 may be provided by a user or third-party vendor and be either implemented on the same platform as the DERMS testing platform 20 or remotely connected to the DERMS testing platform 20. But in other embodiments, the DERMS is simulated on the DERMS testing platform 20 itself.

Also for each agent, the DER simulation module 20S-D provides a communication interface 19G that interfaces that agent to the memory module 20M. In some embodiments, communication between an agent and the memory module 20M over the communication interface 19G is realized through read/write requests. In this case, the operation of the interface 19G will depend on the nature of interface 19A to the DERMS 30. For example, if the interface 19A to the DERMS 30 is based on an event-based protocol such as REST, the agent will handle memory read/write when it gets a GET and POST request from the DERMS 30 under test. However, if the interface 19A to the DERMS 30 is based on a protocol that does not generate events, such as Modbus, the agent will read from the memory module 20M periodically and write to it when the value of a register is updated by the DERMS 30 under test. Regardless, this communication interface 19G to the memory module 20M effectively enables the DER simulation module 20S-D to indirectly communicate with one or more other modules via the memory module 20M. As shown, for example, the power system simulation module 20S-P also interfaces the memory module via a communication interface 19F, meaning that the DER simulation module 20S-D and the power system simulation module 20S-P may indirectly communicate via communication interfaces 19G and 19F, e.g., the DER simulation module 20S-D may write data to the memory module 20M and the power system simulation module 20S-P may read that data from the memory module 20M.

Moreover, for each agent, the DER simulation module 20S-D provides mapping, control functionality, and device functionality. The device and its control functionality encompasses modeling the control functionality of the agent such as control modes of the agent (e.g., for BESS they may be grid forming, or grid following), ride through functionality (these may include voltage or frequency ride through curves), support functionality (e.g. volt-var curves, volt-watt curves, etc.), and supervisory control functionality (e.g., for BESS it would be the power reference following, curtailment for solar photo-voltaic generation system, etc.). The module 20S-D also manages the mapping between the variables of the power system simulation and the various control and measurement points it receives from the communication module respecting the device physics and control relationships of the DER simulated by the agent.

Supplementing the communication interface 19G to the memory module 20M, the DER simulation module 20S-D in one or more embodiments may be capable of directly providing at least some electrical data associated with each agent to the power system simulation module 20S-P via a direct communication interface 19E. This direct communication interface 19E in some embodiments is selectively used to communicate time-sensitive data between an agent and the power system simulation module 20S-P, e.g., so as to directly write time-sensitive data to the power system simulation module 20S-P and/or directly read time-sensitive data from the power system simulation module 20S-P rather than doing so indirectly via the memory module 20M as for other types of data. This hybrid approach to interfacing the DER simulation module 20S-D with the power system simulation module 20S-P via a direct interface 19E as well as an indirect interface 19G via the memory module 20M advantageously allows more efficient scaling as the number of agents increases, yet still preserves the performance needed for time-sensitive simulations. Because the direct interface 19E is more resource-intensive than the indirect interface 19G, limiting the data communicated via the direct interface 19E to time-sensitive data proves more resource efficient as the number of agents scales upward.

FIG. 3 also shows details of the power system simulation module 20S-P in embodiments where the power system simulation is split into N parallel simulations of different subsystems of the power system 11. As shown, the power system simulation module 20S-P includes N subsystem simulation modules 40-1 . . . 40-N, one for each of N subsystems into which the power system 11 is split. The N subsystem simulation modules 40-1 . . . 40-N simulate different respective subsystems of the power system 11 under a test condition 15 in parallel, e.g., using different respective sets of virtualizing compute resources. The power system simulation module 20S-P stiches the results of these parallel simulations together, to derive the simulation result for the power system 11 as a whole. Regardless, the power system simulation module 20S-P may write the results of its simulation(s) to the memory module 20M via its communication interface 19F to the memory module 20M.

The test manager module 20T interfaces the DER simulation module 20S-D, the power system simulation module 20S-P, and the memory module 20M as part of managing testing of the DER 30. In this regard, the test manager module 20T interfaces the DER simulation module 20S-D via a communication interface 19B, e.g., in order to configure parameters of the agent(s) 14 for realizing test conditions 15. In some embodiments, the connection between the test manager module 20T and the DER simulation module 20S-D is established when a new agent is defined for the first time. It will be a call made by the test manager module 20T, where the test environment will use the contents of the payload to initialize the agent 14. More sessions will be established if the agent's mode of operations are required to be changed as part of the scenario and sequence tested.

The test manager module 20T interfaces the memory module 20M via a communication interface 19C. The communication between the test manager module 20T and the memory module 20M may be handled through read and write requests initiated by the test manager module 20T, e.g., to establish and update test runtime parameters like test duration, test status, test identifier, etc. In some embodiments, the communication interface 19C is implemented over an IP-based protocol if the memory module 20M and the test manager module 20T are implemented on separate hosts.

The test manager module 20T interfaces the power system simulation module 20S-P via a communication interface 19D. In some embodiments, a connection between the test manager module 20T and the power system simulation module 20T-P via the communication interface 19D is made on demand when simulation of the power system 11 is initialized and then when changes are made to it. Using an API provided by the power system simulation module 20S-P, the test manager module 20T may add, modify or delete DERs, as well as start, stop, and control the testing of the DER 30. An IP-based protocol may be used for the connection.

FIG. 3 shows that the DERMS testing platform 20 in some embodiments also include a historian module 50. The historian module 50 hosts historizing functionality. The variables to historize, the frequency of historization, and other configurations may be handled by the test manager module 20T, whereas the variables to be historized may be read from the memory module 20M. In some embodiments, the data located in the memory module 20M may be communicated to the historian module 50 by means of a data adapter agent that will continuously monitor incoming data and save it to a database of the historian module 50. This data adapter agent may support various data formats and reduce the complexity of the interface of other modules that need to historize data.

FIG. 3 shows the data source module(s) 20D as including a weather data source module 20D-1. The weather data source module 20D-1 is configured to source weather data relevant to DER(s) 14, e.g., irradiance, temperature, wind speed, etc. The weather data source module 20D-1 in some embodiments sources at least some of the weather data from a third-party data source, e.g., the National Oceanic and Atmospheric Administration (NOAA). The weather data source module 20D-1 may for example retrieve at least some of the weather data via an Application Programming Interface (API) provided by such a third-party data source. In other embodiments, the weather data source module 20D-1 derives or generates at least some of the weather data itself. The weather data source module 20D-1 for instance retrieve one type of weather data from a third-party data source, and then use that retrieve type of weather data to calculate another type of weather data. Alternatively or additionally, the weather data source module 20D-1 may simulate at least some of the weather data.

In addition to getting a weather preset from the manager module 20T, the running environment can also use live, historical or forecasted weather data from online sources (such as NOAA). In some embodiments, the weather data source module 20D-1 acquires online weather data via an IP-based protocol, such as REST, which responds to requests provided with a valid token. The responses may come in the form of a structured-text payload (JavaScript Object Notation, JSON, or Extensible Markup Language, XML), which is parsed and either applied to the memory module 20M as an instantaneous weather condition or stored in the memory module 20M to be applied over time if a duration is selected. This functionality can also be provided by other means such as File Transfer Protocol (FTP) or Secure FTP (SFTP) where the payload data is received as a file, such as Comma-Separated Values (CSV). Either way, the weather data source module 20D-1 interfaces the memory module 20M via a communication interface 19J, e.g., for writing sourced weather data to the memory module 20M so that it is accessible to one or more other modules.

In some embodiments, the data source module(s) 20D alternatively or additionally include a market data source module 20D-2. The market data source module 20D-2 is configured to source energy market data relevant to DER(s) 14, e.g., energy pricing data, energy demand schedules, etc. The market data source module 20D-2 may retrieve at least some of the energy market data from one or more independent system operators (ISOs). The market data source module 20D-2 may alternatively or additionally simulate or otherwise derive at least some of the energy market data itself. Regardless, the market data source module 20D-2 interfaces the memory module 20 via a communication interface 19K. The market data source module 20D-2 may write the sourced energy market data to the memory module 20M via this communication interface 19K.

In some embodiments, the market data source module 20D-2 supports energy market bidding, either with respect to an actual energy market or with respect to a simulated energy market, as part of simulating test conditions 15 under which to test the DERMS 30, e.g., where different test conditions 15 encompass different energy pricing. The market data source module 20D-2 in this case may upload a bid package to a designated location, e.g., using a protocol as specified by the service (e.g., SFTP or REST).

With results of the simulation(s) stored in the memory module 20M, the analytics module 20A accesses those results via a communication interface 19I to the memory module 20M. This communication interface 19I may use internal protocols such as zero-mq or MQTT if implemented within the same environment as the memory module 20M. However, if the analytics module 20A is from a third-party and implemented on a separate platform, an IP-based protocol (such as REST) may be utilized along with the API provided by the analytics engine. Regardless, the analytics module 20A analyzes the results of the simulation(s) and writes the analytics generated to the memory module 20M via the interface 19I.

The visualizations module 20V may then access the analytics in the memory module 20M by reading the analytics over a communication interface 19H. In some embodiments, the visualization module 20V also integrates to the historian module 50 by reading historical data that the historian module 50 wrote to the memory module 20M. Regardless, the visualizations module 20V generates visualizations from the analytics and/or historical data, e.g., charts, tables, or any other format(s) for effectively visualizing the analytics and/or historical data. In some embodiments, the visualizations time synchronize multiple kinds of data for viewing those different kinds of data on a common timescale. The visualization module 20V in some embodiments integrates to various data sources and facilitates data conversions or formatting required to visualize the data effectively.

The user interface (UI) module 20U accesses the simulation results, the analytics, and/or the visualizations stored in the memory module 20M via a communication interface 19L. Communication with the UI module 20U over this communication interface 19L may be done using an on-demand IP-based protocol, e.g., if the UI is not expected to be always running. In some embodiments, relevant memory read or write commands may be handled when a read or write request comes from the UI module 20U and may otherwise stand by to conserve virtualized memory and computation resources. For cases where file transfers are required, protocols such as FTP/SFTP may be used.

Note that in some embodiments one or more of the communication interfaces in FIG. 3 is a physical communication interface. Alternatively or additionally, though, one or more of the communication interfaces may be virtualized, e.g., via a public IP address.

Note also that embodiments herein are applicable to any model of service delivery for enabling on-demand access to the DERMS testing platform 20, e.g., including software-as-a-service, platform-as-a-service, or resource-as-a-service.

Some embodiments herein generally enable utilities to test how the DERMS 30 scales when the number of agents 14 (e.g., physical and/or virtual DERs) increases to a very large number. This enables testing, for example, even if the number of agents 14 is scaled to 100s or 1000s of DERs. Some embodiments enable this by implementing the DERMS testing platform 20 on dynamically allocable virtualized cloud computing resources, rather than on limited, fixed capacity resources of a non-cloud computing server. Some embodiments in this regard include a flexible and modular agent-based simulation platform that allows a user to test a DERMS 30, including the functionality of DER aggregators. The DERMS testing platform 20 herein can be scaled as required by the test use case and is not limited by the number of communication interfaces and computational resources, as they are added as needed on the cloud computing system 10. Cloud computing services may be provided by various vendors allowing the virtualization of infrastructure such that the processing power, memory, and/or storage is scalable and added or removed as needed. In some embodiments, since the DERMS testing platform 20 is flexible and modular in its implementation, it supports utilization of third-party applications for any of the module's functions, e.g., as long as the application provides APIs (without inheriting the application's dependencies such as the operating system and API language). Some embodiments thereby allow a user to test and evaluate a DERMS 30 and will not only help de-risk the DERMS procurement process, but also its implementation.

In some embodiments, the cloud computing system 10 is designed such that the virtualized cloud computing resources (e.g., processing power, data storage, communication bandwidth, communication interfaces, and/or features) used by any module can be added (or removed) as required by the functionality being tested. This provides a convenient way of scaling up the testbed, especially to test the scalability of a DERMS 30. This contrasts with conventional testbeds that are implemented on fixed resources, i.e., with limited communication endpoints, and limited network simulation capacity. Some embodiments address this issue by having a modular architecture of the test platform and having its implementation on the cloud, e.g., using a resources-as-a-service model, such that the resources are added as needed, resulting in convenient scaling of the testbed as required by the application and use cases tested.

Note here that a DERMS provides an ability to observe, control, and manage multiple DERs, and the reasons for which certain entities would want to control and mange DERs may be different as guided by their motivations. The overall objective of control and management of DERs by these entities is called a DERMS use case. For example, a third-party aggregator may have a use case of managing DERs to bid into the energy market as a day-ahead capacity or reserve, or real-time emergency reserve resource.

Some embodiments herein thereby provide a modular and scalable test bed architecture that allows implementation of the testbed on the cloud, e.g., leveraging a "resource-as-a-service" model of cloud computation for scalability purposes. Some embodiments are exposed as a service and therefore simplify and accelerate the testbed deployment as long as the DERMS 30 under test can communicate with its interfaces. Some embodiments accordingly provide a modular design of a state-estimator/network simulator that breaks down the network model into sections that are required to be simulated. The decoupled simulation results then are stitched up to generate results of the larger network.

In view of the modifications and variations herein, FIG. 4 depicts a method performed by a cloud computing system 10 in accordance with particular embodiments. The method includes implementing a DERMS testing platform 20 on virtualized cloud computing resources 16 of the cloud computing system 10 (Block 100). The DERMS testing platform 20 is a platform for testing the DERMS 30. In some embodiments, the DERMS testing platform 20 is modularized into at least a simulation module 20S configured to simulate one or more DERs 14 of the power system 10 and a communication module 20C that communicatively interfaces the DERMS 30 with the one or more DERs 40 via one or more communication networks 13. The simulation module 20S may be further configured to simulate the power system 10 under test conditions 15 as the DERMS 30 manages operation of the one or more DERs 14 via the communication module 20C.

Regardless, the method also includes exposing the DERMS testing platform 20 as a service for testing the DERMS 30 under test conditions 15 (Block 110). In some embodiments, this involves providing an interface that a customer can use to access the DERMS testing platform 20, e.g., with the DERMS testing platform 20 modules hosted on one or more virtual machines with a user interface. The interface provided can be used to manually configure the test manager and/or manually configure and control the execution of tests and test routines. It can also be used to monitor the test progress, view results, and generate reports.

The method further includes scaling the virtualized cloud computing resources 16 allocated to the DERMS testing platform 30 with the number of the one or more DERs 14 simulated under different test conditions 15 (Block 120).

In some embodiments, the method also includes scaling the number of the one or more DERs 14 under different test conditions 15, as part of a service for testing scalability of the DERMS 30 (Block 130).

Embodiments herein also include corresponding apparatuses. Embodiments herein for instance include a cloud computing system 11 configured to perform any of the steps of any of the embodiments described above.

Embodiments also include a cloud computing system 11 comprising processing circuitry and power supply circuitry. The processing circuitry is configured to perform any of the steps of any of the embodiments described above. The power supply circuitry is configured to supply power to the cloud computing system 11.

Embodiments further include a cloud computing system 11 comprising processing circuitry. The processing circuitry is configured to perform any of the steps of any of the embodiments described above for the cloud computing system 11. In some embodiments, the cloud computing system 11 further comprises communication circuitry.

Embodiments further include a cloud computing system 11 comprising processing circuitry and memory. The memory contains instructions executable by the processing circuitry whereby the computing equipment is configured to perform any of the steps of any of the embodiments described above.

Embodiments moreover include a cloud computing system 11 that comprises cloud computing infrastructure configured to perform any of the steps of any of the embodiments described above.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for carrying out one or more of the techniques described herein, in several embodiments. In embodiments that employ memory, the memory stores program code that, when executed by the one or more processors, carries out the techniques described herein.

Figure 5:
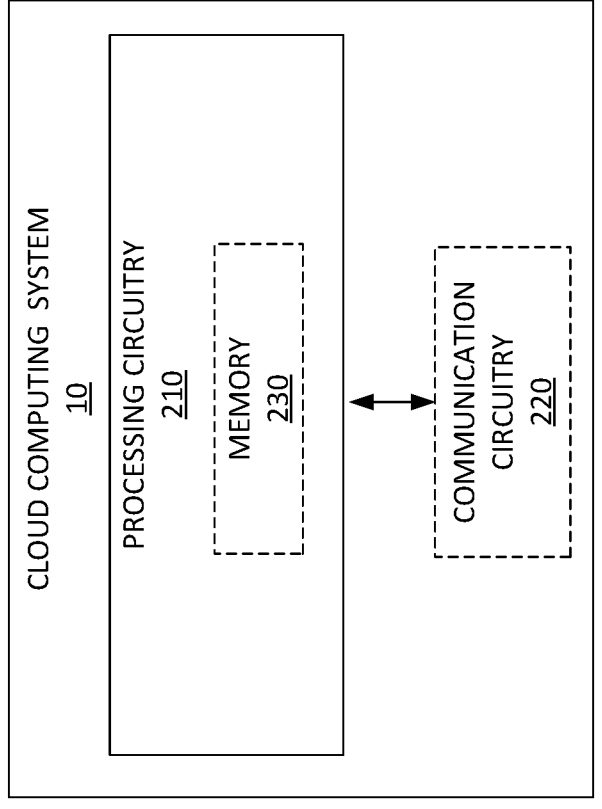
FIG. 5 is a block diagram of a cloud computing system according to some embodiments.

FIG. 5 shows the cloud computing system 10 according to some embodiments. The cloud computing system 10 includes processing circuitry 210 and communication circuitry 220. The communication circuitry 220 is configured to transmit and/or receive information to and/or from one or more other nodes, e.g., via any communication technology. The processing circuitry 210 is configured to perform processing described above, e.g., in FIG. 4, such as by executing instructions stored in memory 230. The processing circuitry 210 in this regard may implement certain functional means, units, or modules.

Note that the cloud computing system 100 may be distributed across multiple computing devices or machines, e.g., so that the processing circuitry 210, communication circuitry 220, and/or memory 230 is distributed over multiple devices or machines. Whether centralized or distributed, though, at least some of the processing circuitry 210, communication circuitry 220, and/or memory 230 may be included within a pool of virtualized cloud computing resources 16 allocable to the DERMS testing platform 20.

Those skilled in the art will also appreciate that embodiments herein further include corresponding computer programs.

A computer program comprises instructions which, when executed on at least one processor of a cloud computing system 11, cause the cloud computing system 11 to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of computing equipment, cause the computing equipment to perform as described above.

Embodiments further include a computer program product comprising program code portions for performing the steps of any of the embodiments herein when the computer program product is executed by computing equipment. This computer program product may be stored on a computer readable recording medium.

In certain embodiments, some or all of the functionality described herein may be provided by processing circuitry executing instructions stored in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole.

What is claimed is:

1. A method performed by a cloud computing system for testing a Distributed Energy Resource (DER) Management System (DERMS) configured to manage operation of DERs connected to a power system, the method comprising:

implementing a DERMS testing platform on virtualized cloud computing resources of the cloud computing system, wherein the DERMS testing platform is a platform for testing the DERMS and is modularized into at least:

a simulation module configured to simulate one or more DERs of the power system; and a communication module that communicatively interfaces the DERMS with the one or more DERs via one or more communication networks;

wherein the simulation module is further configured to simulate the power system under test conditions as the DERMS manages operation of the one or more DERs via the communication module;

exposing the DERMS testing platform as a service for testing the DERMS under test conditions; and scaling the virtualized cloud computing resources allocated to the DERMS testing platform with the number of the one or more DERs simulated under different test conditions.

2. The method of claim 1, wherein the simulation module is further modularized into a DER simulation module configured to simulate the one or more DERs and a power system simulation module configured to simulate the power system.

3. The method of claim 2, wherein the DER simulation module is configured to model physics and functionality of each of the one or more DERs, and wherein the power system simulation module is configured to simulate physics and topological relationships between the one or more DERs under the different test conditions.

4. The method of claim 1, wherein the simulation module is configured to simulate the power system under a test condition by dividing the power system into multiple subsystems, simulating different subsystems under the test condition in parallel using different sets of virtualized cloud computing resources, and stitching simulation results for the subsystems together to derive a simulation result for the power system as a whole under the test condition.

5. The method of claim 1, wherein scaling the virtualized cloud computing resources allocated to the DERMS testing platform comprises scaling the virtualized cloud computing resources respectively allocated to different modules of the DERMS testing platform on a module by module basis.

6. The method of claim 1, further comprising scaling the number of the one or more DERs under different test conditions as part of a service for testing scalability of the DERMS, and wherein scaling the virtualized cloud computing resources comprises, based on the scaling of the number of the one or more DERs:

scaling virtualized compute and/or memory resources allocated to the one or more DERs and/or the simulation module; and scaling virtualized communication resources allocated to the communication module.

7. The method of claim 1, wherein scaling the virtualized cloud computing resources comprises separately scaling different types of virtualized cloud computing resources with the number of the one or more DERs simulated under different test conditions, wherein the different types of virtualized cloud computing resources include at least compute resources, memory resources, and communication resources.

8. The method of claim 1, wherein the DERMS testing platform is further modularized into a memory module comprising virtualized memory shared amongst at least some modules of the DERMS testing platform that are configured to communicate with one another via the shared virtualized memory, and wherein scaling the virtualized cloud computing resources allocated to the DERMS testing platform comprises scaling the virtualized memory allocated to the memory module with the number of the one or more DERs simulated under different test conditions.

9. The method of claim 1, wherein the DERMS testing platform is further modularized into a test manager module configured to define, execute, and/or manage testing of the DERMS under different test conditions as part of the service.

10. The method of claim 1, wherein the DERMS testing platform is further modularized into one or more of:

an analytics module configured to generate analytics representing results of testing the DERMS under different test conditions;

a visualization module configured to generate visualizations of the analytics generated by the analytics module;

a user interface module configured to provide an interface to a user of the DERMS testing platform to configure and/or control one or more other modules of the DERMS testing platform; and/or one or more data source modules configured to source one or more respective types of data based on which different test conditions are defined, wherein the one or more respective types of data include weather data and/or energy market data.

11. The method of claim 1, wherein the one or more DERs include one or more virtual DERs, with each virtual DER aggregated from multiple physical DERs of the power system.

12. A cloud computing system for testing a Distributed Energy Resource (DER) Management System (DERMS) configured to manage operation of DERs connected to a power system, the cloud computing system comprising cloud computing infrastructure configured to:

host virtualized cloud computing resources;

implement a DERMS testing platform on the virtualized cloud computing resources, wherein the DERMS testing platform is a platform for testing the DERMS and is modularized into at least:

a simulation module configured to simulate one or more DERs of the power system; and a communication module that communicatively interfaces the DERMS with the one or more DERs via one or more communication networks;

wherein the simulation module is further configured to simulate the power system under test conditions as the DERMS manages operation of the one or more DERs via the communication module;

expose the DERMS testing platform as a service for testing the DERMS under test conditions; and scale the virtualized cloud computing resources allocated to the DERMS testing platform with the number of the one or more DERs simulated under different test conditions.

13. The cloud computing system of claim 12, wherein the simulation module is further modularized into a DER simulation module configured to simulate the one or more DERs and a power system simulation module configured to simulate the power system.

14. The cloud computing system of claim 13, wherein the DER simulation module is configured to model physics and functionality of each of the one or more DERs, and wherein the power system simulation module is configured to simulate physics and topological relationships between the one or more DERs under the different test conditions.

15. The cloud computing system of claim 12, wherein the simulation module is configured to simulate the power system under a test condition by dividing the power system into multiple subsystems, simulating different subsystems under the test condition in parallel using different sets of virtualized cloud computing resources, and stitching simulation results for the subsystems together to derive a simulation result for the power system as a whole under the test condition.

16. The cloud computing system of claim 12, wherein the cloud computing infrastructure is configured to scale the virtualized cloud computing resources allocated to the DERMS testing platform by scaling the virtualized cloud computing resources respectively allocated to different modules of the DERMS testing platform on a module by module basis.

17. The cloud computing system of claim 12, wherein the cloud computing infrastructure is further configured to scale the number of the one or more DERs under different test conditions as part of a service for testing scalability of the DERMS, and wherein the cloud computing infrastructure is configured to scale the virtualized cloud computing resources by, based on the scaling of the number of the one or more DERs:

scaling virtualized compute and/or memory resources allocated to the one or more DERs and/or the simulation module; and scaling virtualized communication resources allocated to the communication module.

18. The cloud computing system of claim 12, wherein the cloud computing infrastructure is configured to scale the virtualized cloud computing resources by separately scaling different types of virtualized cloud computing resources with the number of the one or more DERs simulated under different test conditions, wherein the different types of virtualized cloud computing resources include at least compute resources, memory resources, and communication resources.

19. The cloud computing system of claim 12, wherein the DERMS testing platform is further modularized into a memory module comprising virtualized memory shared amongst at least some modules of the DERMS testing platform that are configured to communicate with one another via the shared virtualized memory, and wherein the cloud computing infrastructure is configured to scale the virtualized cloud computing resources allocated to the DERMS testing platform by scaling the virtualized memory allocated to the memory module with the number of the one or more DERs simulated under different test conditions.

20. The cloud computing system of claim 12, wherein the DERMS testing platform is further modularized into a test manager module configured to define, execute, and/or manage testing of the DERMS under different test conditions as part of the service.

21. The cloud computing system of claim 12, wherein the DERMS testing platform is further modularized into one or more of:

an analytics module configured to generate analytics representing results of testing the DERMS under different test conditions;

a visualization module configured to generate visualizations of the analytics generated by the analytics module;

a user interface module configured to provide an interface to a user of the DERMS testing platform to configure and/or control one or more other modules of the DERMS testing platform; and/or one or more data source modules configured to source one or more respective types of data based on which different test conditions are defined, wherein the one or more respective types of data include weather data and/or energy market data.

22. The cloud computing system of claim 12, wherein the one or more DERs include one or more virtual DERs, with each virtual DER aggregated from multiple physical DERs of the power system.

23. A non-transitory computer-readable storage medium on which is stored instructions which, when executed by one or more processors of a cloud computing system, causes the cloud computing system to:

host virtualized cloud computing resources;

implement a Distributed Energy Resource (DER) Management System (DERMS) testing platform on the virtualized cloud computing resources, wherein the DERMS testing platform is a platform for testing the DERMS and is modularized into at least:

a simulation module configured to simulate one or more DERs of a power system; and a communication module that communicatively interfaces the DERMS with the one or more DERs via one or more communication networks;

wherein the simulation module is further configured to simulate the power system under test conditions as the DERMS manages operation of the one or more DERs via the communication module;

expose the DERMS testing platform as a service for testing the DERMS under test conditions; and scale the virtualized cloud computing resources allocated to the DERMS testing platform with the number of the one or more DERs simulated under different test conditions.

24. The cloud computing system of claim 12, wherein the DERMS testing platform is configured to simulate and control the test conditions so that different test conditions represent different postulated numbers of the one or more DERs being communicatively interfaced with the DERMS via the one or more communication networks, as part of testing how the DERMS manages operation of the one or more DERs as the numbers of the one or more DERs scale.

25. The cloud computing system of claim 24, wherein the test conditions further represent one or more of:

different postulated weather conditions; and/or different postulated energy market conditions.

26. The cloud computing system of claim 24, wherein the virtualized communication resources include compute resources, memory resources, and communication resources, and wherein the cloud computing infrastructure is configured to scale the virtualized cloud computing resources by scaling the communication resources allocated to the communication module, as the numbers of the one or more DERs communicatively interfaced with the DERMS scale, separately from any scaling of the compute resources and/or memory resources.

*   *   *   *   *